United States Patent Office 2,763,291
Patented Sept. 18, 1956

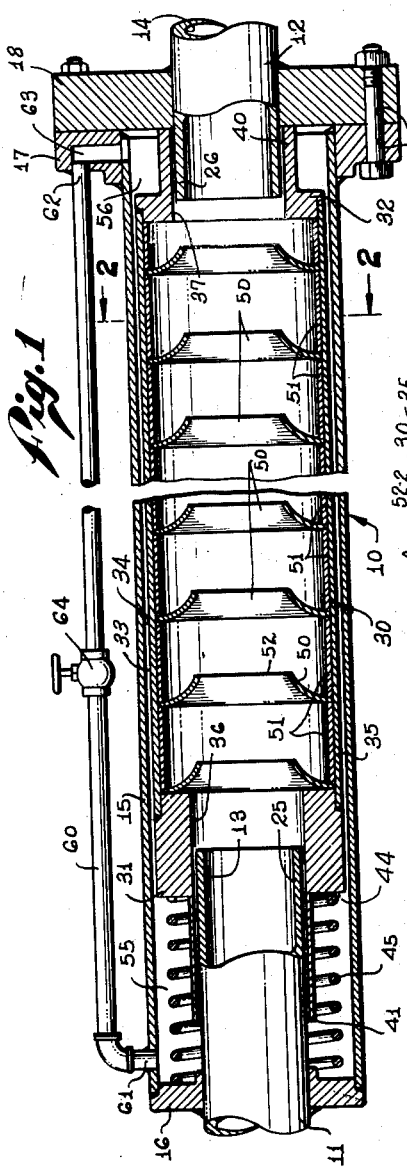

2,763,291

SHOCK WAVE ABSORBER

Robert Earl Snyder, Pasadena, Calif.

Application January 15, 1954, Serial No. 404,270

10 Claims. (Cl. 138—26)

My invention relates to the art of wave absorbers and more particularly to an improved type inline wave absorber for inclusion into hydraulic systems to absorb and dissipate the various waves traveling through the entrained fluid.

In hydraulic systems the operation of the system gives rise to various disturbances which are propagated throughout the system in the form of waves in the entrained fluid. These waves travel through the fluid regardless of whether or not it is in motion through the system. These waves may arise from change in the rate of flow of the fluid, valve action, turbulence in flow around bends, through fittings, etc. Some waves travel with sonic velocities their velocity being a function of the elasticity and density of the fluid in the system. Other waves are of the hydraulic vibrational type requiring an actual mass movement of the fluid back and forth a distance greater than the normal elastic limits of the fluid particle under sonic waves. The velocity of hydraulic vibration may be less than that of sonic waves though they are often accompanied by sonic wave components. However, both sonic waves and the slower hydraulic vibration type waves exhibit a commonly characteristic wave front.

It is thus the major object of my invention to provide a means of spreading out, absorbing and attenuating the wave front energy as it passes through the absorber and further to convert the absorbed energy into a non-wave type of energy and thus remove the wave energy from the entrained fluid.

It is commonly known that a wave front travels generally down a pipe or tubular container substantially normal to the axis of the container. When the wave front passes from a small diameter tube into a larger diameter tube, the wave front spreads radially outward and encompasses the larger diameter. The energy level over the wave front quickly equalizes itself over the whole front. It is further known that when a large wave front approaches a small opening only that portion directly opposite the opening will pass into it. The balance of the wave front will be reflected backward or spread out and dissipated depending upon the characteristics of the container.

It is therefore another object of the invention to provide a series of areas where the wave front may spread out and a further series of openings connecting the spread-out areas through which only a fraction of the wave front entering each consecutive area may pass on to the next area. Thus, the total energy in the original wave front may be dissipated by leaving portions of that total energy in each of the spread-out areas through which the wave must travel.

Absorbed wave energy may be converted into mechanical energy when the wave energy is trapped in a means capable of making the conversion. It thus becomes another object of the invention to provide means for converting the trapped wave energy into mechanical energy.

It is still a further object of the invention to provide means for absorbing the mechanical energy by making it do work upon the entrained fluid which is non-returnable to the system in a wave form.

The series of spread-out areas are separated by orificed plates whose shape and disposition determine their effectiveness to absorb wave energy passing through the system. These orificed plates also affect the resistance to the flow of fluid through the system. If the plates are substantially flat and normal to the direction of flow, then a wave from either direction will be trapped by the plates; whereas, if the plates have conical orifices in line with the flow of fluid, their maximum absorption becomes more directional. If the orifices through the plates are out of line with each other, the resultant labyrinth flow of the fluid will be very effective to absorb waves but the resistance to flow of fluid through the unit will be excessively high. Thus, a major object of the invention is to provide an absorber which will combine maximum absorption of the wave energy with minimum resistance to the flow of fluid therethrough.

It is still a further object to construct an absorber which will be rugged, which may be simply and easily installed in the hydraulic line and which will require a minimum of service.

These and other objects and advantages of this invention will be apparent from a consideration of the following specification, read in connection with the accompanying drawings, wherein:

Figure 1 is an axial longitudinal section of one form of the absorber;

Figure 2 is a diametral cross-section of the absorber shown in Figure 1 taken along the line 2—2 on Figure 1;

Figure 3 is a diagrammatic representation of the passage of a wave front through the absorber;

Figure 4 is an axial longitudinal section of an alternate form of the absorber; and Figure 5 is a diametral cross-section taken along the line 5—5 of Figure 4.

The absorber shown in Figure 1 consists of a cylindrical main chamber 10 having two pipes 11 and 12 affixed in opposite ends of the chamber with their respective bores 13 and 14 in axial alignment. The two pipes are provided with conventional threads, flanges or an equivalent means (not shown) to connect the absorber into a hydraulic system.

Chamber 10 is comprised essentially of a tubular, outer shell 15 which is affixed at one end as by welding to an inwardly projecting flange 16, which in turn is affixed as by welding to the pipe 11. The pipe 11 extends into chamber 10 for a substantial distance from where it is affixed to flange 16. The opposite end of tubular shell 15 is provided with an outwardly extending flange 17 affixed solidly to the tubular shell. A complementally faced flange 18 is affixed to the pipe 14 a distance back from the inner end of the pipe. A plurality of complemental bolt holes 19 in the two flanges are provided with suitable nuts and bolts 20 adapted to be tightened to hold the flanges 17 and 18 in sealed relationship. Thus, by connecting the two pipes 11 and 12 into the hydraulic system, the hydraulic fluid may enter through bore 13 of pipe 11, pass through chamber 10, and leave the chamber through bore 14 of the pipe 12.

The inner extension 25 of pipe 11 and the inner extension 26 of pipe 12 provide shoulders upon their respective outer surfaces which are in axial alignment. A tubular wave absorber 30 is mounted within the main chamber 10 and held concentric therewith by being slidably mounted upon the inner extension 25 of pipe 12 at one end 31 and upon the inner extension 26 of pipe 13 at the other end 32. The wave absorber 30 includes a tubular body 35 to which the inwardly projecting flange ends 31 and 32 are affixed as by welding. A concentric bore 36 in the end 31 provides for smooth sliding engagement upon pipe extension 25 and a similar concentric bore 37 in the end 32 provides for smooth sliding engagement upon pipe extension 26. The wave absorber 30 is thus freely slidable for a limited axial distance upon the inner extensions 25 and 26 and its outer circumference 33 has just barely free sliding clearance with bore 34 of the main chamber.

The end 32 of the wave absorber is provided with a stop 40 adapted to seat against the inner face of flange 18 and serve as a limit for the movement of the wave absorber toward pipe 12. The opposite end 31 of the wave absorber is also provided with a stop 41 adapted to seat against the inner face of the flange 16. There is substantial clearance between the overall length of the wave absorber 30 and the two flanges 16 and 18 to allow the wave absorber substantial axial movement upon its end mounts.

Inwardly of stop 41 a shoulder 44 is provided on the end 31 of the wave absorber. A compression spring 45 is positioned around pipe extension 25 and stop 41 and is seated between the wave absorber shoulder 44 and the inner face of flange 16. This spring is adapted to urge the wave absorber 30 toward the chamber flange 18 so that in the normal position the wave absorber, stop 40 rests against the inner face of flange 18. Movement of wave absorber 30 in the opposite direction causes spring 45 to be compressed, its maximum compression being limited by the contact of stop 41 on the wave absorber with the flange 16.

A plurality of orifice plates 50 held in spaced-apart relationship by spacers 51 are mounted within the wave absorber 30. The plates 50 are solidly affixed within the absorber and are thus movable therewith. The form of plates 50 as shown in Figure 1 is similar to that of a bell-shaped orifice. The actual shape of the plates may be varied from a flat plate with a hole in it, like a standard orifice plate, to a plate shaped like a conic section. The shape of the plate for maximum attenuation of the wave is determined by the particulars of the fluid used, of the waves and of the system in which the absorber is to be used.

In that form of the invention shown in Figure 1, the fluid passageway or orifice 52 through plate 50 is substantially the same as the diameter of pipe bores 13 and 14. For some operational conditions, the orifice 52 may be made smaller if a pressure drop is required or is permissible in the system and the wave absorption efficiency will be increased. In other cases, the orifice of the plate may be made larger than that of the connecting pipe bores, but this may require that the entire size of the unit be increased. The most economic proportions are probably approximately as shown in Figure 1, as described.

By reference to Figure 3, the diagrammatic operation of the absorber is shown. The parts and structure of the diagrammatic absorber are similar to and bear the same reference numbers as those shown on the absorber in Figure 1. A wave front E enters the absorber from the pipe 12 traveling axially down the pipe. The cross-sectional area of the pipe may be designated by the value "$a_p$." The cross-sectional area "$A_A$" on the inside of the wave absorber 30 may be, for example, twice as great as the area of the pipe. The area of the orifice 52 through each of the plates 50 is shown as equal to that of the pipe value "$a_p$." As the original wave E emerges from the inner end of the pipe 12, it enters into the larger diameter of the wave absorber 30. The wave front begins to spread out, as indicated in the diagram, by the successively increasing arcuate lines. The energy of the original wave E spreads out substantially uniformly over the larger front.

When the wave reaches the first orifice 52—1, only that portion of the whole wave front opposite the orifice will pass through the orifice. That portion of the original wave on either side of the orifice will be deflected upwardly into the area between the first plate 50—1 and the tubular shell 35 of wave absorber 30. In this position, that portion of the original wave so deflected will not be able to pass through orifice 52—1 of the first plate 50—1, but will be absorbed by the wave absorber 30.

The total energy in that section of the original wave E which does pass through the first orifice 52—1 bears a relationship to the original energy which is determined by the relation between the area "$a_p$" of the orifice 50—1 and the total cross-sectional area "$A_A$" of the wave absorber. This relationship has been suggested as an example that "$a_p = \frac{1}{2} A_A$." Thus, the total energy of the wave front $e_1$ passing through the orifice 52—1 is one-half of the energy in the original wave front E which entered the absorber from pipe 12. If other ratios are used between the two areas, corresponding percentages of the total wave energy pass through the orifice.

In a similar manner, as the new wave front $e_1$ passes through the first orifice 52—1, it begins to spread out over the large area "$A_A$" beyond the first orifice and when it reaches the next plate 50—2, only a portion of the total energy $e_1$ is in position to pass through the second orifice 52—2. The portion of the total energy $e_1$ outside the area of the second orifice 52—2 will be deflected and absorbed by the wave absorber while only the smaller portion $e_2$ of the total energy $e_1$ passes on through the second orifice 52—2. Thus, the wave front energy is again diminished so that $e_2$ is only one-quarter of the energy in the original wave E.

In a similar manner, each of the next successive plates 50—3, 50—4, 50—5, and 50—6, cuts off a portion of the wave energy and deflects it into the pockets where it is absorbed by the wave absorber 30. The wave energy in each succeeding wave front is diminished accordingly so that the wave energy in the wave $e_6$ which passes through the orifice 52—6 in the last plate 50—6 has approximately $\frac{1}{64}$ or 1.56% of the energy which was in the original wave E that entered the absorber.

As the wave $e_6$ leaves the last orifice 52—6, it spreads once more so that only a portion of it represented by $e_7$ actually enters the outlet pipe 11 to travel therethrough into the hydraulic system. Thus, of the 100% of energy E which entered the wave absorber, less than 1% or $\frac{1}{128}$ (.78%) emerges from the wave absorber through the outlet pipe. Obviously, this small percentage may be still further reduced by the use of more plates and orifices if it is necessary or advantageous to do so. Broadly speaking, the wave energy can be reduced any desired degree by the proper size and structure of the wave absorber.

The actual shape of the orifice plate and the relationship of the orifices with respect to each other in the adjacent plates is very important. Primarily the orifices should be in axial alignment to avoid creating labyrinth friction and high fluid resistance to passage through the absorber even though such non-axial alignment of the orifices in the adjacent plates would contribute to the absorption of the waves traveling through the absorber. A low pressure drop through the absorber is most economical for the hydraulic system as a whole.

If the plates are flat with round orifice holes in them, the plates will tend to absorb and dissipate a wave approaching either side of the plate; whereas if the plates are bell-shaped, as in Figure 1 or conic sectional as in Figure 4, (hereinafter described) there will tend to be less absorption of the wave entering the large end of the orifice (from left to right in the drawings) than if the wave enters the small end of the orifice (from right to left in the drawings). Thus, a flat plate absorber is more multi-directional in its absorption, whereas a shaped plate tends to be more uni-directional in its absorption. The design of the plate is determined by the requirements of the system in which the absorber is to be used.

The length of the spacers 51 between the plates 50 depends upon the angle at which the wave front spreads out after passing through the orifices 52 in each of the plates. If the plate is flat with a round hole in it, the angle of expansion of the wave will be minimum, whereas, if the orifice is bell-shaped or conical, then the angle of the wave expansion will tend to be greater. Each of the spacers 51 should be axially long enough for the waves $e_1$, $e_2$, etc. passing through the orifices 52—1, 52—2, etc. to spread out uniformly over the larger area "$A_A$" inside of the wave absorber 30 before contacting the next adjacent orifice.

Returning to the structure shown in Figure 1, the absorbed portions of the wave energy E which entered the wave absorber 30 from the pipe 12, exert a mechanical thrust upon the wave absorber toward the pipe 11. This thrust causes the wave absorber 30 to move toward pipe 11 and to compress the spring 45. The line fluid seeping through the clearance between the end sections 31 and 32 and the pipe extensions 25 and 26, respectively, fills the whole of the inside of the main chamber 10. The annular chamber 55 between the flange 16 and the end section 31 outside of the pipe extension 25 and inside of the outer tube 15 of the main chamber is full of fluid. The opposite annular chamber 56 between the flange 18 and the end section 32, outside of the pipe extension 26 and inside of the outer tube 15 and flange 17 of the main chamber is also full of fluid.

In order for the wave absorber 30 to move axially toward end flange 16, some of the fluid in the annular chamber 55 must be displaced around into the opposite end chamber 56. The clearance between the outer tube 35 of the wave absorber and the inside of the outer tube 15 may be too small to accomplish this fluid flow at the required rate. A bypass line 60 is connected at one end 61 to the annular chamber 55 and at the other end 62 to a channel 63 in the flange 17 opening into the annular chamber 56. An orifice valve 64 located in the bypass line serves to regulate the rate of flow of fluid therethrough between the two annular chambers.

Thus, the axial movement of the wave absorber 30 under absorbed wave energy displaces fluid from chamber 55 to chamber 56, and this wave energy absorbed by the wave absorber is dissipated by primary absorption of the spring and subsequent further and complete dissipation by a pressure drop of the fluid as it passes back and forth through the orifice valve 64. The original movement of the wave absorber toward the flange 16 compresses the spring and displaces fluid from chamber 55 to the chamber 56 after which the spring moves the wave absorber back to its original position with stop 40 against the flange 18 and displaces fluid back from chamber 56 to chamber 55.

An alternate structure of the wave absorber and pipe sections is shown in Figure 4. In this structure, the main chamber 10' is substantially the same as the main chamber 10 shown in Figure 1. An inwardly extending end flange 16' is welded to one end of the outer tube 15' and at the other end of the tube is an outwardly extending flange 17' which is attached by conventional flange bolts to end flange 18'. However, in this structure the pipe 12' attached to the flange 18' does not extend inwardly of this flange, in fact it does not extend through the flange. The inner end 70 of the pipe 12' stops short of the inner face of the flange leaving a recess 71 between the inner end of the pipe and the inner face of the flange 18'. On the opposite end of the structure, the pipe 11' is affixed into the end flange 16' and extends completely through the main chamber 10' to set its inner end 73 within the recess 71 provided in the opposite end flange 18'. Thus, concentricity between the bores 13' and 14' of the two pipes 11' and 12' is easily maintained.

The wave absorber 30' is of slightly different dimension and proportion, but is comprised of the same essential parts, an inwardly extending flange 31', fixedly attached to one end of the tubular body 35' and a second inwardly extending flange 32' similarly attached to the other end of the tubular body. Within the tubular body, a plurality of conical-section plates 50' are held in spaced relationship between the two end flanges 31' and 32'. The end flanges 31' and 32' are provided with concentric bores 36' and 37', respectively, and adapted to make slidable engagement with the outside diameter of that portion of the pipe 11' extending into the inside of the main chamber 10'. In this structure, the orifices 52' through each of the successive plates 50' must be as large as the bores 36' and 37' in the respective end flanges 31' and 32' so that the whole wave absorber 30' can slide axially upon the pipe 11'.

A compression spring 45' is positioned around the pipe 11' inside the main chamber and abuts at one end against the inner face of end flange 16' and at the other end against the outer vertical face of end flange 31'. As in the structure shown in Figure 1, this spring is designed to urge the wave absorber 30' axially toward the flange 18' so that the outer end face of the absorber flange 32' may serve as a stop against the flange 18.

In order that there shall be space for the wave within the pipe 11' to expand into the areas between the sequential plates 50', a plurality of arcuate segments are cut out of the pipe 11' leaving a plurality of spaced holes 80. These holes 80 are spaced circumferentially around the pipe 11' leaving three uncut sections 81 between the holes 80 to hold the resulting lattice structure together. The sections 81 of the structure may best be seen in the cross-sectional drawing of Figure 5.

Between each group of holes 80, a circumferential section 82 of the pipe 11' is left to give axial rigidity to the pipe 11'. The axial length of the holes 80 is substantially equal to the distance between the orifice plates 50' and the normal rest position of the wave absorber 30 is, as shown in Figure 4, where each circumferential section 82 is positioned at and within the normal orifice hole 52' of the respective plate 50'. It should further be noted that the front and back edges 84 and 85 of the respective holes 80 along the circumferental sections 82 are shaped at an angle similar to that of the conical surfaces of the abutting edges of the orifices 52' and form a virtual continuance thereof.

Between the outside 33' of the wave absorber 30' and the bore of the outer tube 15' of the main chamber 10' there is substantial annular clearance 87 which may serve as a passageway for the fluid in the spring chamber 55' as the wave absorber 30' moves axially toward the end flange 16'. In this structure, no external bypass line is shown, but it is obvious that by altering the dimensions of this structure, it can be adapted to use the hydraulic bypass control previously described for Figure 1. It is equally obvious that the structure of Figure 1 can be adapted by mere use of the clearance 33 between the absorber shell 35 and the outer shell 15 so that the hydraulic pipe bypass 60 is not necessary.

The operation of the alternate form of absorber is substantially the same as that described for the structure shown in Figure 1. Entry of a wave front from the pipe 12' allows it to spread out and portions to be trapped and absorbed by each plate sequentially as the wave travels through the unit toward the outlet end where pipe 11' enters the main chamber. The trapped wave energy creates mechanical movement of the wave absorber 30' which compresses the spring and further dissipates the absorbed energy by dashpot action of the fluid around the moving wave absorber. Thus, the wave energy is dissipated and not returned to the system in a wave form.

The absorbed structures, as shown in Figures 1 and 4, will have optimum wave absorption of the wave energy when the wave travels from pipes 12 and 12' toward pipes 11 and 11', respectively (from right to left through the units in the drawings). Waves traveling in the opposite direction while broken up and weakened, show a much lesser degree of absorption. However, the resistance to the flow of fluid through the units is less if traveling from pipe 11 and 11' toward pipes 12 and 12', respectively, due to the structure of the plates 50 and 50', respectively, in the two units. If the plates 50 were flat with round holes in them, then the resistance to the flow of fluid through the unit would be the same in each direction and the wave energy absorption would be the same in each direction.

In the directional absorber types, as shown in Figures 1 and 4, waves entering from pipes 11 and 11' and traveling toward pipes 12 and 12', respectively, produce no movement of the absorbers 30 and 30', respectively. For two directional absorbers, two of the above units can be reversed and placed end-to-end in the line to thereby absorb waves from either direction, or a single composite absorber may be used. In such a unit, the shaped plates may be in two groups facing their respective directions and a spring placed at each end of the absorber 30 between the absorber and the shell 10. If flat plates are used, only a single set is necessary in the double spring supported absorber to absorb waves from either direction.

However, in most piping systems, the waves bounce back and forth in the system and a unidirectional absorber will catch the wave either directly or on the first reflected reversal and so absorb it.

While various preferred forms of the invention have been described and illustrated herein, the invention is not to be limited to the details of construction shown and described, except as defined in the appended claims.

I claim:

1. Apparatus for absorbing waves in a hydraulic system, comprising: a chamber; a pipe sealed to and extending into the interior of said chamber; a second pipe axially concentric with said first pipe and extending into the interior of said chamber, the ends of said two pipes being spaced apart within said chamber; a wave absorber within said chamber slidably mounted upon said two pipe extensions and bridging the space between the ends of two said pipes; a plurality of orificed plates affixed within said wave absorber and within the space between the ends of the said two pipes, through which orifices fluid flowing from one of said pipes must pass to the other of said pipes; and resilient means between said wave absorber and said main chamber urging said wave absorber toward one of said pipes.

2. Apparatus for absorbing waves in a hydraulic system, comprising: means forming a longitudinal cylindrical chamber; a pipe sealed to and opening into the interior of said chamber; a second pipe sealed to and extending across the interior of said chamber to abut its bore against the bore of said first pipe; a plurality of orifices in said second pipe; a tubular member within said chamber and slidably mounted upon and bridging the orifices in said second pipe; a plurality of orificed plates affixed within said member and adjacent the orifices in said second pipe; and resilient means between said tubular member and said main chamber urging said member toward one of said pipes.

3. A device for absorbing hydraulic wave energy comprising: a main chamber having a pair of ports adapted to be connected into a pipe carrying hydraulic fluid; an inner chamber axially slidable within said main chamber and opening into said ports; a plurality of spaced bell-shaped orifice plates affixed to the inner wall of said inner chamber, the wider end of said bell-shaped orifices being positioned on the downstream side of said inner chamber, said orifice plates having axially defined openings and being movable as a unit with said inner chamber, said axial movement of said inner chamber from a reference position caused by the absorption of at least a portion of said wave energy of said fluid; and means returning said inner chamber to said reference position after absorption of said wave energy of said fluid.

4. A device for absorbing hydraulic wave energy comprising: a main chamber having a pair of ports adapted to be connected into a pipe carrying hydraulic fluid; an inner chamber axially slidable within said main chamber and opening into said ports; a plurality of spaced conic-shaped orifice plates affixed to the inner wall of said chamber, the wider end of said conic-shaped orifices being positioned on the downstream side of said inner chamber, said orifice plates having axially defined openings and being movable as a unit with said inner chamber, said axial movement of said inner chamber being caused by the absorption of at least a portion of said wave energy of said fluid regardless of the flow rate of said fluid; and a resilient means positioned between one end of said inner chamber and an adjacent part of said main chamber urging said inner chamber towards one end of said pipe.

5. A device for absorbing hydraulic wave energy comprising: a main chamber having a pair of ports adapted to be connected into a pipe carrying hydraulic fluid; an inner chamber axially slidable within said main chamber and opening into said ports; a plurality of spaced angularly inwardly extending orifice plates affixed to the inner wall of said chamber, the wider end of said orifice plates being positioned on the downstream side of said inner chamber, said orifice plates having axially defined openings and being movable as a unit with said inner chamber, the axial length between adjacent spaced orifice plates being at least approximately equal to the length required for the wave fronts of said wave energy to spread out uniformly over the larger cross-sectional area defined between said adjacent orifice plates the axial movement of said inner chamber being caused by the absorption of at least a portion of said wave energy of said fluid regardless of the flow rate of said fluid; and resilient means positioned between one end of said inner chamber and an adjacent part of said main chamber urging said inner chamber toward one end of said pipe.

6. A device for absorbing hydraulic wave energy comprising: a main chamber having a pair of ports adapted to be connected into a pipe carrying hydraulic fluid; means defining a plurality of spaced alternating larger and smaller openings mounted for axial movement from a reference position within said chamber, said axial movement of said defining means caused by the absorption of at least a portion of said wave energy of said fluid; and dashpot means located between said movable defining means and said main chamber whereby wave energy absorbed by said movable defining means may be dissipated into said fluid as work.

7. In a pipe carrying hydraulic fluid, an apparatus for absorbing wave energy comprising: a chamber having inlet and outlet ports; conduit means movably mounted within said chamber so that the flow of fluid between said two ports will still pass through said conduit; a plurality of spaced orificed plates affixed within said conduit means and movable therewith by means of wave energy in the fluid; and resilient means between said conduit means and said chamber.

8. Apparatus for absorbing waves in a hydraulic system, comprising: an outer chamber; a pipe sealed to and extending into the interior of said outer chamber; a second pipe axially concentric with said first pipe and extending into the interior of said outer chamber, the ends of said two pipes being spaced apart therein; an inner chamber bridging said pipe ends and axially movable within said outer chamber; a series of spaced coaxial orifice plates mounted within said inner chamber, the axial length of said spaces between orifice plates being approximately equal to the length required for the wave front created by said wave energy to spread out uniformly over the larger cross-sectional area defined between adjacent orifice plates, said orifice plates being axially movable with said inner chamber by the absorption of wave energy from said hydraulic fluid; and a resilient means positioned between one end of said inner and an adjacent part of said outer chamber translating the axial movement of said orifice plates into work in the entrained fluid.

9. Apparatus for absorbing waves in a hydraulic system comprising: an outer chamber having a pair of ports adapted to connect said chamber into a pipe carrying hydraulic fluid; means forming an inner chamber mounted for limited axial movement within said outer chamber and between said two ports, the flow of fluid between said two ports passing through said inner chamber; means forming a plurality of orifices in spaced-apart relationship within said inner chamber and fixed thereto, the fluid passing through said chamber being directed through said orifices; means converting the wave energy absorbed by said orifice means into mechanical work, including a resilient means positioned between one end of said inner chamber and an adjacent part of said outer chamber, urging said inner chamber towards one port of said outer chamber and adapted to permit limited movement of said inner chamber; and dashpot means between said inner and outer chamber whereby wave energy absorbed by said movable inner chamber may be dissipated into the entrained fluid as mechanical work.

10. Apparatus for absorbing waves in a hydraulic system, comprising: a chamber; a pipe sealed to and extending into the interior of said chamber; a second pipe axially concentric with said first pipe and extending into the interior of said chamber, the ends of said two pipes being spaced apart within said chamber; a wave absorber within said chamber slidably mounted upon said two pipe extensions and bridging the space between the ends of two said pipes, an annular cavity being provided between the outside of said absorber and the walls of said chamber substantially isolated to the flow of hydraulic fluid therethrough; a plurality of orificed plates affixed within said wave absorber and within the space between the ends of the said two pipes, through which orifices fluid flowing from one of said pipes must pass to the other of said pipes; and resilient means in said annular cavity between said wave absorber and said main chamber urging said wave absorber toward one of said pipes.

References Cited in the file of this patent

UNITED STATES PATENTS

| | | |
|---|---|---|
| 1,663,998 | Schmidt | Mar. 27, 1928 |
| 1,784,673 | Loepsinger et al. | Dec. 9, 1930 |
| 2,327,542 | Matteson | Aug. 24, 1943 |
| 2,670,011 | Bertin | Feb. 23, 1954 |
| 2,678,066 | Carter | May 11, 1954 |

FOREIGN PATENTS

| | | |
|---|---|---|
| 330,151 | Germany | Dec. 11, 1920 |